United States Patent
Tanada

(10) Patent No.: US 9,397,780 B2
(45) Date of Patent: Jul. 19, 2016

(54) RECEIVING DEVICE AND RECEIVING METHOD, AND COMPUTER PROGRAM

(71) Applicant: NEC Corporation, Tokyo (JP)

(72) Inventor: Kazuo Tanada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 36 days.

(21) Appl. No.: 14/411,643

(22) PCT Filed: Feb. 27, 2013

(86) PCT No.: PCT/JP2013/055099
§ 371 (c)(1),
(2) Date: Dec. 29, 2014

(87) PCT Pub. No.: WO2014/002528
PCT Pub. Date: Jan. 3, 2014

(65) Prior Publication Data
US 2015/0207588 A1   Jul. 23, 2015

(30) Foreign Application Priority Data

Jun. 29, 2012  (JP) ................................ 2012-147528

(51) Int. Cl.
*G01R 31/08* (2006.01)
*G06F 11/00* (2006.01)
(Continued)

(52) U.S. Cl.
CPC ............... *H04L 1/0003* (2013.01); *H04B 1/16* (2013.01); *H04J 1/16* (2013.01); *H04L 1/0015* (2013.01);
(Continued)

(58) Field of Classification Search
CPC ............. H04L 1/0003; H04L 25/0202; H04L 25/0224
See application file for complete search history.

(56) References Cited

U.S. PATENT DOCUMENTS

2009/0262695 A1* 10/2009 Chen ..................... H04L 5/0053
370/329

FOREIGN PATENT DOCUMENTS

JP   2007-104574   4/2007
JP   2010-212981   9/2010
(Continued)

OTHER PUBLICATIONS

Japanese Office Action dated Oct. 27, 2015, with English Translation; Application No. 2014-522448.

(Continued)

*Primary Examiner* — Derrick Ferris
*Assistant Examiner* — Farhad Ali
(74) *Attorney, Agent, or Firm* — Young & Thompson

(57) ABSTRACT

A receiving device receiving a SC-FDMA signal includes a first calculating unit calculating a first channel estimation value indicating a propagation path state based on a sounding reference signal transmitted from a transmitting end device; a second calculating unit calculating a rank determination value and a modulation and coding scheme (MCS) determination value based on the first channel estimation value, the rank determination value and MCS determination value being associated with a transmission rank number and a transmission coding ratio/modulation scheme respectively, and used when the transmitting end device next transmits a data channel; a third calculating unit calculating a second channel estimation value indicating a propagation path state based on a demodulation reference signal by using interpolation processing in accordance with at least one of the rank determination value and the MCS determination value; and a demodulation/decoding unit acting on a data channel using the second channel estimation value.

6 Claims, 10 Drawing Sheets

(51) Int. Cl.
  *G08C 15/00*    (2006.01)
  *H04J 1/16*    (2006.01)
  *H04J 3/14*    (2006.01)
  *H04L 1/00*    (2006.01)
  *H04L 12/26*    (2006.01)
  *H04L 25/02*    (2006.01)
  *H04L 27/26*    (2006.01)
  *H04B 1/16*    (2006.01)

(52) U.S. Cl.
  CPC ............ *H04L 1/0026* (2013.01); *H04L 1/0035* (2013.01); *H04L 25/022* (2013.01); *H04L 25/0202* (2013.01); *H04L 25/0224* (2013.01); *H04L 25/0228* (2013.01); *H04L 27/2636* (2013.01); *H04L 27/2647* (2013.01)

(56) References Cited

FOREIGN PATENT DOCUMENTS

| | | |
|---|---|---|
| JP | 2010-232898 | 10/2010 |
| JP | 2012-039215 | 2/2012 |
| JP | 2012-060407 | 3/2012 |

OTHER PUBLICATIONS

International Search Report PCT/JP2013/055099 dated May 28, 2013.

3GPP TS 36.211 V10.4.0 (Dec. 2011).

\* cited by examiner

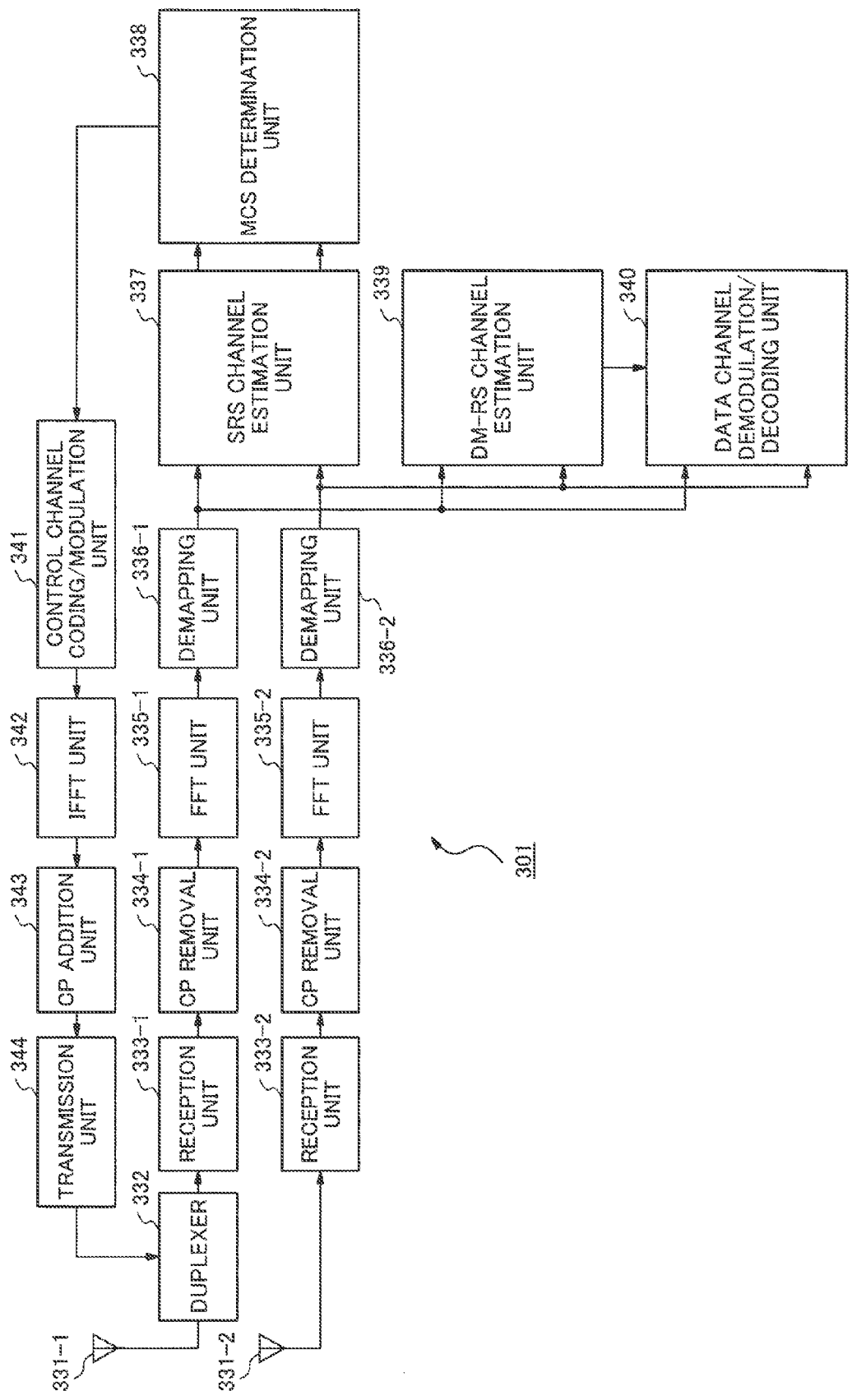

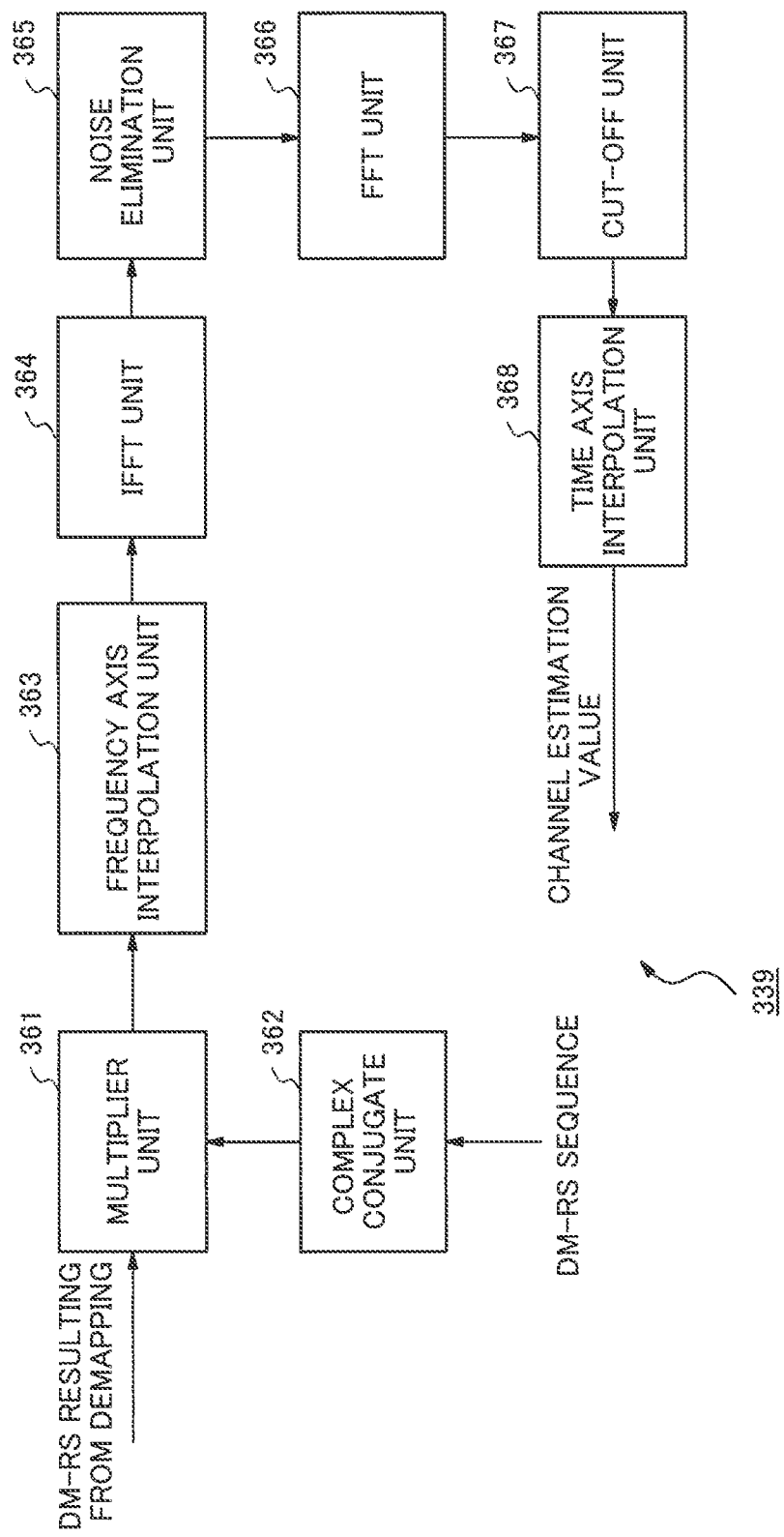

US 9,397,780 B2

RECEIVING DEVICE AND RECEIVING METHOD, AND COMPUTER PROGRAM

TECHNICAL FIELD

This disclosure relates to a receiving device, a receiving method, and a computer program.

BACKGROUND ART

A configuration of a receiver which receives a single carrier-frequency division multiple access (SC-FDMA) signal is shown in FIGS. 9 and 10. In addition, a mobile station performs transmission under the state in which one antenna is used and a rank is fixed to one.

FIG. 9 is a block diagram illustrating a configuration of a base station. A base station 301 includes antennas 331-1 and 331-2; a duplexer 332; reception units 333-1 and 333-2; a cyclic prefix (CP) removal units 334-1 and 334-2; Fast Fourier Transform (FFT) units 335-1 and 335-2; demapping units 336-1 and 336-2; a sounding reference signal (SRS) channel estimation unit 337; a modulation and coding scheme (MCS) determination unit 338; a demodulation reference signal (DM-RS) channel estimation unit 339; a data channel demodulation/decoding unit 340; a control channel coding/modulation unit 341; an Inverse Fast Fourier Transform (IFFT) unit 342; a CP addition unit 343; and a transmission unit 344.

Each of the reception unit 333-1 and 333-2 converts a received signal having been received by a corresponding cue of the antennas 331-1 and 331-2 into a baseband signal. Each of the CP removal units 334-1 and 334-2 removes a CP from each of SC-FDMA symbols of the baseband signal. Each of the FFT units 335-1 and 335-2 performs, for each SC-FDMA symbol, FFT processing on the baseband signal resulting from the removal of the CPs and thereby transforms the baseband signal into a frequency-domain signal. Each of the den-tapping units 336-1 and 336-2 extracts an SRS, a DM-RS, and a data channel from the frequency-domain baseband signal.

The SRS channel estimation unit 337 calculates a first channel estimation value indicating a propagation-path state on the basis of the SRS. The MCS determination unit 338 calculates an MCS determination value, which is a transmission coding/modulation scheme for use in a next data-channel transmission by a mobile station, on the basis of the first channel estimation value supplied by the SRS channel estimation unit 337, and supplies the MCS determination value to the control channel coding/modulation unit 341. Here, an estimation value of a signal-to-interference pins noise power ratio (SINR) is calculated on the basis of the first channel estimation value, and the MCS determination value is determined on the basis of the calculated SINR estimation value by referring to a predetermined table in which each of MCS values is associated with a corresponding one of SINR ranges.

The DM-RS channel estimation unit 339 calculates a second channel estimation value indicating a propagation-path state on the basis of the DM-RS. The data channel demodulation/decoding unit 340 performs demodulation/decoding of the data channel by using the second channel estimation value.

The control channel coding/modulation unit 341 multiplexes the MCS determination value into a control channel, and performs coding and modulation of a resultant control channel. The IFFT unit 342 performs, for each of orthogonal frequency division multiplex (OFDM) symbols, IFFT processing on the modulated control channel and thereby transforms the modulated control channel into a time-domain baseband signal. The CP addition unit 343 adds, for each of the OFDM symbols, a CP to the time-domain baseband signal. The transmission unit 344 performs up-conversion of the baseband signal resulting from the addition of the CPs to convert the baseband signal into a radio frequency (RF) signal. The RF signal is transmitted, from the antenna 331-1 via the duplexer 332.

FIG. 10 is a block diagram illustrating a configuration of the DM-RS channel estimation unit 339. The DM-RS channel estimation unit 339 includes a multiplier unit 361; a complex conjugate unit 362; a frequency axis interpolation unit 363; an IFFT unit 364; a noise elimination unit 365; an FFT unit 366; a cat-off unit 367, and a time axis interpolation unit 368.

The complex conjugate unit 362 calculates a complex conjugate value of a known DM-RS sequence which is internally generated. The multiplier unit 361 multiplies a DM-RS, which results from demapping, by the complex conjugate value, and thereby removes modulated elements of the DM-RS. The frequency axis interpolation unit 363 performs interpolation processing in the frequency direction on a signal resulting from the removal of modulated elements included in the DM-RS by a difference number by which the number of actual sub-carriers is smaller as compared with the number of sampling points of art IFFT performed at a posterior stage (the difference number being associated with the number of unused sub-carriers). Here, as a method of the above interpolation processing, a method of interpolation processing shown in NPL 1 is employed.

Alternatively, as shown in PTL 2, a signal-noise ratio (SNR) is estimated, and in the case where the SNR is smaller than a predetermined threshold value, the interpolation processing is not performed and each of unused sub-carrier portions are fixedly made zero. The IFFT unit 364 performs IFFT processing on a signal resulting from the interpolation processing, and thereby generates a channel profile on the time axis. The noise elimination unit 365 eliminates noise elements of the channel profile on the time axis. The FFT unit 366 performs FFT processing on a signal resulting from the noise elimination, and thereby transforms the signal into a frequency domain signal. The cut-off unit 36 removes signals each having been interpolated through the interpolation processing on a corresponding one of the unused sob-carrier portions, from signals included in the frequency domain signal. The time axis interpolation unit 368 performs interpolation processing in the time direction on a frequency domain signal resulting from the removal of the signals having been interpolated on the unused sub-carrier portions, and calculates a channel estimation value for one sub-frame including portions in each of which any DM-RS is not multiplexed.

In PTL 1, there is disclosed a receiving device which estimates an impulse response by using a pilot signal which is disposed in a band whose width is narrower than that of a band on which an FFT is performed. This receiving device includes a reception unit that receives information data pieces and a pilot signal which are allocated for each of predetermined resources, and a propagation path estimation unit that calculates a propagation path estimation value by using the pilot signal, and a signal detection unit that detects the information data pieces. This propagation path estimation unit estimates the impulse response by using a pilot signal which has been transmitted by a transmitting device identical to a transmitting device having transmitted the information data pieces and which belongs to a resource different from a resource to which the information data pieces have been allocated.

CITATION LIST

Patent Literature

PTL 1: Japanese Unexamined Patent Application Publication No. 2012-60407 PTL 2: Japanese Unexamined Patent Application Publication No. 2007-104574

Non Patent Literature

NPL 1: "Channel Estimation by Adding a Virtual Channel Frequency Response", The 2006 IEICE (The Institute of Electronics, Information and Communication Engineers) General conference B-5-94 NPL 2: 3GPP TS36.211 V.10.4.0 (2011-12).

SUMMARY OF INVENTION

Technical Problem

However, in the receiver disclosed in each of the literatures listed in the citation list above, there are problems described below.

A first problem is that, since the frequency direction interpolation processing by the frequency axis interpolation unit is fixedly determined, in a system in which a transmission rank is adaptively changed in accordance with a propagation-path state, when a transmission rank number becomes larger than "1", the accuracy of a channel estimation value regarding each of high-frequency sub-carriers degrades to a great degree.

A second problem is that, in the case where, when an SNR is estimated and the estimated SNR is smaller than a predetermined threshold value, the interpolation processing is not performed, processing for estimating an SNR on the basis of a received DM-RS becomes necessary and this necessity of the processing leads to the increase of a circuit size and processing delay.

That is, in each of the literatures listed in the citation list above, in the receiver for receiving an SC-FDMA signal, a channel estimation has been performed under the state in frequency direction interpolation processing on unused subcarriers is fixedly determined. Thus, in a system in which a transmission rank and a transmission coding ratio/modulation scheme are adaptively changed, the interpolation, processing does not become an optimum one depending on conditions and thereby, the degradation of channel estimation accuracy has been caused.

Further, there is a method of changing the interpolation processing on the basis of an estimated signal-power to noise-power ratio (SNR), but this method needs exclusive SNR estimation, and thus, leads to the increase of a circuit size and processing delay.

Thus, the present invention is intended to solve the aforementioned problems, that is, to provide a receiving device, a receiving method, and a program which make it possible to, even when at least one of a transmission rank number and a transmission coding ratio/modulation scheme is changed in accordance with a propagation-path state, perform optimum channel estimation in accordance with conditions in a simple and easy way without increasing a circuit size and processing delay.

Solution to Problem

In order to solve the aforementioned problem, according to a first aspect of the present invention, a receiving device that receives a single carder-frequency division multiple access (SC-FDMA) signal includes a first calculating means that calculates a first channel estimation value indicating a state of a propagation path, on the basis of a sounding reference signal transmitted from a transmitting end device; a second calculating means that calculates a rank determination value and a modulation and coding scheme (MCS) determination value on the basis of the first channel estimation value, the rank determination value and the MCS determination value being associated with a transmission rank number and a transmission coding ratio/modulation scheme, respectively, which are used when the transmitting end device transmits a data channel next; a third calculating means that calculates a second channel estimation value indicating a state of a propagation path, on the basis of a demodulation reference signal, by using interpolation processing in accordance with at least one of the rank determination value and the MCS determination value; and a demodulation/decoding means that performs demodulation and decoding of a data channel by using the second channel estimation value.

Further, according to a second aspect of the present invention, a receiving method for receiving a SC-FDMA signal includes calculating a first channel estimation value indicating a state of a propagation path, on the basis of a sounding reference signal transmitted from a transmitting end device; calculating a rank, determination value and a modulation and coding scheme (MCS) determination value on the basis of the first channel estimation value, the rank determination value and the MCS determination value being associated with a transmission rank number and a transmission coding ratio/modulation scheme, respectively, which are used when the transmitting end device transmits a data channel next: calculating a second channel estimation value indicating a state of a propagation path, on the basis of a demodulation reference signal, by using interpolation processing in accordance with at least one of the rank determination value and the MCS determination value; and performing demodulation and decoding of a data channel by using the second channel estimation value.

Further, according to a third aspect of the present invention, a program that causes a computer of a receiving device that receives a SC-FDMA signal to execute processing comprising the processes of: calculating a first channel estimation value indicating a state of a propagation path, on the basis of a sounding reference signal transmitted from a transmitting end device; calculating a rank determination value and a modulation and coding scheme (MCS) determination value on the basis of the first channel estimation value, the rank determination value and the MCS determination value being associated with a transmission rank number and a transmission coding ratio/modulation scheme, respectively, which are used when the transmitting end device transmits a data channel next; calculating a second channel estimation value indicating a state of a propagation path, on the basis of a demodulation reference signal, by using interpolation processing in accordance with at least one of the rank determination value and the MCS determination value; and performing demodulation and decoding of a data channel by using the second channel estimation value.

Advantageous Effects of Invention

According to some aspects of the present invention, it is possible to, even when at least one of a transmission rank number and a transmission coding ratio/modulation scheme is changed in accordance with a propagation-path state, provide a receiving device and a receiving method as well as a program which make it possible to perform optimum, channel estimation in accordance with conditions in a simple and easy way without increasing a circuit size and processing delay.

DESCRIPTION OF EMBODIMENTS

Hereinafter, a communication system of an exemplary embodiment of the present invention will be described with reference to FIGS. 1 to 8.

Figure 1:
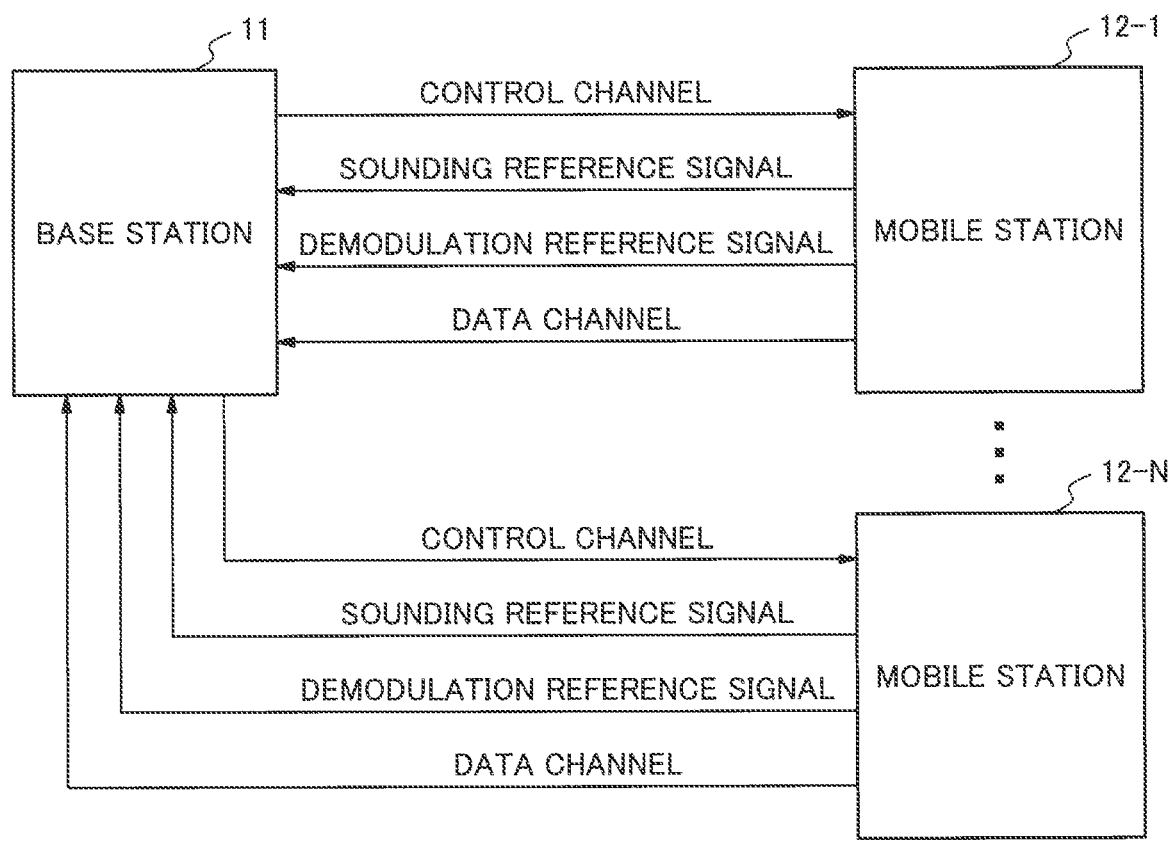
FIG. 1 A block diagram illustrating an example of a configuration of a communication system of an exemplary embodiment of the present invention FIG. 2 A block diagram illustrating an example of a configuration of a base station 11

FIG. 1 is a block diagram illustrating an example of a configuration of a communication system of an exemplary embodiment of the present invention. The communication system includes a base station 11 and mobile stations 12-1 to 12-N (N being a positive integer). Each of the mobile stations 12-1 to 12-N transmits a sounding reference signal (SRS). The base station 11, which, is an example of the receiving device, performs reception processing on the SRS; calculates a rank determination value and an MCS determination value; and notifies the rank determination value and the MCS determination value to the each of the mobile stations 12-1 to 12-N via a control channel. Each of the mobile stations 12-1 to 12-N performs transmission processing on a demodulation reference signal (DM-RS) and a data channel on the basis of the rank determination value and the MCS determination value having been notified via the control channel, and transmits the DM-RS and the data channel to the base station 11. The base station 11 performs reception processing on the DM-RS and calculation of a channel estimation value, and further performs reception processing on the data channel by using the channel estimation value.

Hereinafter, the mobile stations 12-1 to 12-N will be referred to as just a mobile station 12 when any separation thereof into individuals is not needed in description.

Figure 2:
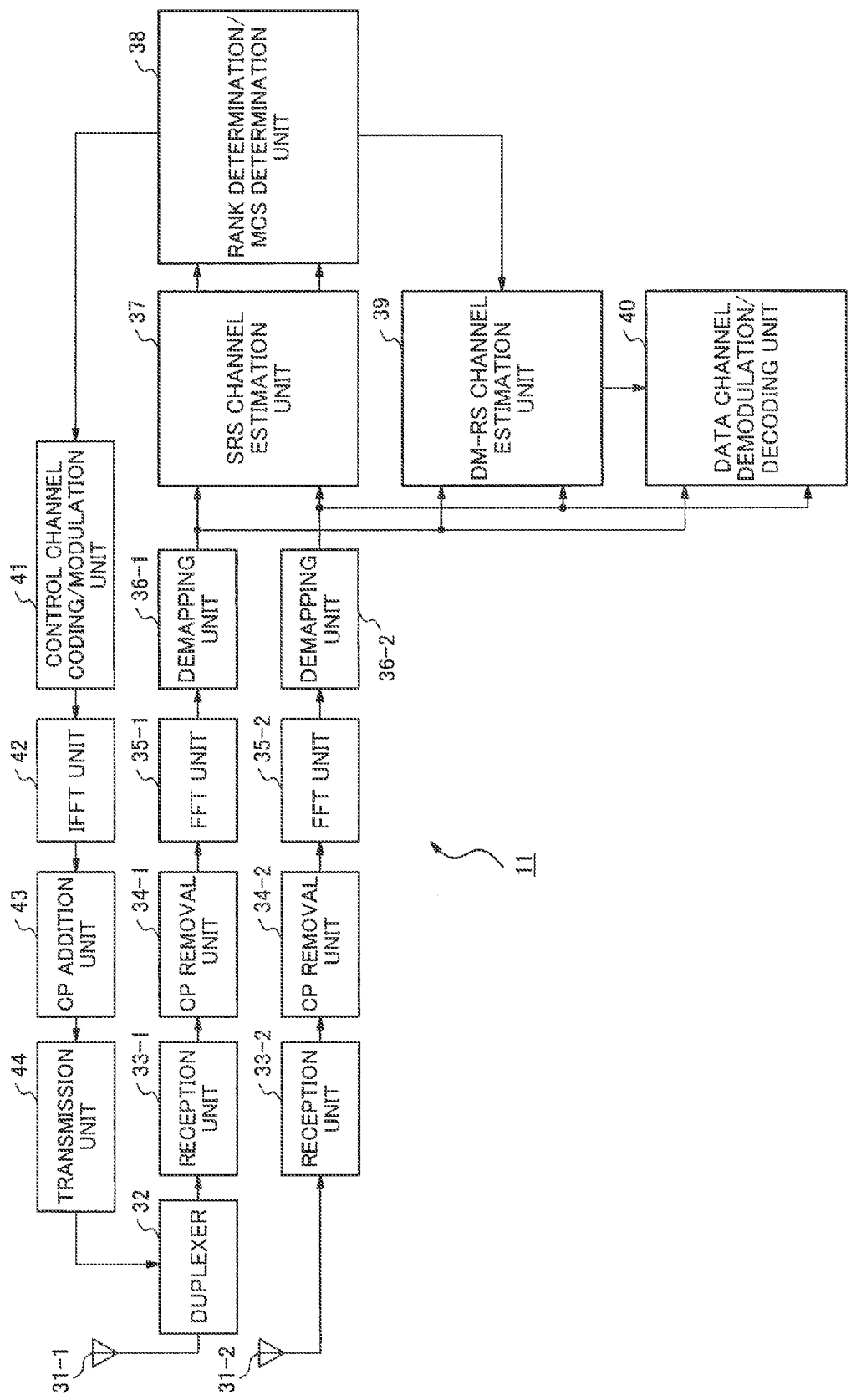

FIG. 2 is a block diagram illustrating an example of a configuration of the base station 11. The base station 11 includes antennas 31-1 and 31-2; a duplexer 32; reception units 33-1 and 33-2; CP removal units 34-1 and 34-2; FFT units 35-1 and 35-2; demapping units 36-1 and 36-2; an SRS channel estimation unit 37; a rank determination/MCS determination unit 38; a DM-RS channel estimation unit 39; a data channel, demodulation/decoding unit 40; a control channel coding/modulation unit 41; an IFFT unit 42; a CP addition unit 43; and a transmission unit 44.

Each of the reception unit 33-1 and 33-2 converts a received signal having been received by a corresponding one of the antennas 31-1 and 31-2 into a baseband signal. The reception unit 33-1 supplies the baseband signal to the CP removal unit 34-1, and the reception unit 33-2 supplies the baseband signal to the CP removal unit 34-2.

Each of the CP removal units 34-1 and 34-2 removes a CP from, each of SC-FDMA symbols of the baseband signal. Each of baseband signals, which results from the removal of the CPs from the SC-FDMA symbols, is supplied to a corresponding one of the FFT units 35-1 and 35-2. Each of the FFT units 35-1 and 35-2 performs, for each of SC-FDMA symbols, FFT processing or the baseband signal resulting from the removal of the CPs and thereby transforms the baseband signal into a frequency-domain signal. Each of the frequency-domain signals is supplied to a corresponding one of the demapping units 36-1 and 36-2.

Each of the demapping units 36-1 and 36-2 extracts an SRS, an DM-RS, and a data channel from a corresponding one of the the frequency-domain baseband signals. Each of the SRSs is supplied to the SRS channel estimation unit 37; each of the DM-RSs is supplied to the DM-RS channel estimation unit 39; and each of the data channels is supplied to the data channel demodulation/decoding unit 40.

The SRS channel estimation unit 37, which is an example of the first calculation means, calculates a first channel estimation value indicating a propagation-path state on the basis of a corresponding one of the SRSs. The first channel estimation values are supplied to the rank determination/MCS determination unit 38. The rank determination/MCS determination unit 338, which is an example of the second calculation means, calculates, on the basis of the first channel estimation values, a rank determination value and an MCS determination value corresponding to a transmission rank number and a transmission coding/modulation scheme, respectively, which, are used by a mobile station when this mobile station transmits a data channel next. The rank determination value and the MCS determination value are supplied to the DM-RS channel estimation unit 39 and the control channel coding/modulation unit 41.

The control channel coding/modulation unit 41 multiplexes the rank determination value and the MCS determination value into a control channel, and performs coding and modulation of a resultant control channel. A control channel, resulting from multiplexing of the rank determination value and the MCS determination value as well as coding and modulation is supplied to the IFFT unit 42. The IFFT unit 42 performs, for each of OFDM symbols, IFFT processing on the modulated control channel and thereby transforms the modulated control channel into a time-domain baseband signal. The time-domain baseband signal is supplied to the CP addition unit 43.

The CP addition unit 43 adds, for each of the OFDM symbols, a CP to the time-domain baseband signal. The baseband signal to which the CPs have been added is supplied to the transmission unit 44. The transmission unit 44 performs up-conversion of the baseband signal resulting from the addition of the CPs and thereby converts the baseband signal into a radio frequency (RF) signal. The RF signal is transmitted from the antenna 31-1 via the duplexes 32.

The DM-RS channel estimation unit 39, which is an example of the third calculation means, calculates a second channel estimation value which Indicates a propagation-path state in accordance with a rank determination value, on the basis of the DM-RS. The second channel estimation value is supplied to the data channel demodulation/decoding unit 40. The data channel demodulation/decoding unit 40, which is an example of the modulation/decoding means, performs demodulation/decoding of the data channel, by using the second channel estimation value.

Next, the details of an example of a configuration of the DM-RS channel estimation unit 39 will be described with reference to FIG. 3. The DM-RS channel estimation unit 39 includes a multiplier unit 61; a complex conjugate unit 62; an equalizing unit 63; a frequency axis interpolation unit 64, an IFFT unit 65; a noise elimination, unit 66, an FFT unit 67; a cut-off unit 68, and a time axis interpolation unit 69.

The complex conjugate unit 62 calculates a complex conjugate value of a known DM-RS series which is internally generated. The complex conjugate value of the known DM-RS series is supplied to the multiplier unit 61. The multiplier unit 61 multiplies a DM-RS, which results from demapping, by the complex conjugate, and thereby removes modulated elements of the DM-RS. A signal resulting from the removal of the modulated elements of the DM-RS is supplied to the equalizing unit 63. The equalizing unit 63 performs equalizing between a first slot and a second slot with respect to the signal resulting from the removal of the modulated elements of the DM-RS. A signal resulting from the equalizing is supplied to the frequency axis interpolation unit 64.

The frequency axis interpolation unit 64 performs interpolation processing in the frequency direction on the signal resulting from the equalizing by a difference number by which the number of actual sob-carriers is smaller as compared with the number of sampling points of an IFFT performed, at a posterior stage (hereinafter, sub-carriers of the difference number will be referred to unused sub-carriers). Here, the method of interpolation processing is changed in accordance with the rank determination value. A signal resulting from the interpolation processing is supplied to the IFFT unit 65. The IFFT unit 65 performs IFFT processing on the signal resulting from the interpolation processing, and thereby generates a channel profile on the time axis. The channel profile on the time axis is supplied to the noise elimination unit 66. The noise elimination unit 66 eliminates noise elements and interference elements which are included in the channel profile on the time axis. A signal resulting from the elimination of the noise elements and interference elements is supplied to the FFT unit 67.

The FFT unit 67 performs FFT processing on the signal resulting from the elimination of the noise elements and the interference elements, and thereby transforms the signal into a frequency domain signal. The frequency domain signal is supplied to the cut-off unit 68. The cut-off unit 68 removes signals each having been interpolated through the interpolation processing on the unused sub-carrier portions, from signals included in the frequency domain signal. A signal resulting from the removal of the signals having been Interpolated on the unused sub-carrier portions is supplied to the time axis interpolation unit 69. The time axis interpolation unit 69 performs interpolation processing in the time direction on a frequency domain signal resulting from the removal of the signals having been Interpolated on the unused sub-carrier portions, and calculates a channel estimation value for one sub-frame including portions on each of which any DM-RS is not multiplexed.

Here, operation of the base station 11 will be described. When each of received signals, having been received by a corresponding one of the two antennas, that is, the antennas 31-1 and 31-2, is given to a corresponding one of the reception units 33-1 and 33-2, each of the reception units 33-1 and 33-2 converts the received signal into a baseband signal by performing down-conversion of the received signal, and supplies the baseband signal to a corresponding one of the CP removal units 34-1 and 34-2. Each of the CP removal units 34-1 and 34-2 removes a CP from each of SC-FDMA symbols of the baseband signal, and supplies a baseband signal resulting from the removal of the CPs to a corresponding one of the FFT units 35-1 and 35-2. Each of the FFT units 35-1 and 35-2 performs, for each, of the SC-FDMA symbols, FFT processing on the baseband signal resulting from the removal of the CPs to transform the baseband signal into a frequency-domain, signal, and supplies the frequency-domain signal to a corresponding one of the demapping units 36-1 and 36-2.

Each of the demapping units 36-1 and 36-2 demultiplexes and extracts an SRS, an DM-RS, and a data channel from the frequency-domain signal on the basis of a prescribed multiplexing rule. Each of the extracted SRSs is supplied to the SRS channel estimation unit 37; and each of the DM-RSs is supplied to the DM-RS channel estimation unit 39. Further, each of the extracted data channels is supplied to the data channel demodulation/decoding unit 40. The SRS channel estimation unit 37 calculates, on the basis of each of the extracted SRSs, a corresponding one of first channel estimation values each indicating a propagation-path state, and supplies the first channel estimation values to the rank determination/MCS determination unit 38.

Here, processing for the channel estimation in the SRS channel estimation unit 37 is, for example, processing which is similar to the processing for the channel estimation in the DM-RS channel estimation unit 39 and which does not include the processing by the equalizing unit 63 and the processing by the time axis interpolation unit 69, and is similar to the processing by the frequency axis interpolation unit 64 in a respect that interpolation processing appropriate to the number of transmitting antennas is fixedly performed.

The rank determination/MCS determination unit 38 calculates, on the basis of the first channel estimation values, a rank determination value and an MCS determination value corresponding to a transmission rank number and a transmission coding ratio/modulation scheme, respectively, which are used when one of the mobile stations 12-1 to 12-N transmits a data channel next. Further, the rank determination/MCS determination unit 38 supplies the rank determination value to the control channel coding/modulation unit 41 and the DM-RS channel estimation unit 39, and supplies the MCS determination value to the control channel coding/modulation unit 41. Here, for example, the rank determination value is obtained in such a way as follows: for each of transmission rank number candidates, an estimation value of a signal-to-interference plus noise power ratio (SINR) in the case where transmission is performed in accordance with the transmission rank number candidate is calculated on the basis of the first channel estimation values; and a transmission rank number candidate for which a calculated estimation value is not smaller than a predetermined threshold value and is larger than any other one of the calculated estimation values is determined as the rank determination value. Further, for example, the MCS determination value is determined on the basis of the calculated SINR estimation value by referring to a predetermined table in which, each of MCS values is associated with a corresponding one of SINR ranges.

The control channel coding/modulation unit 41 multiplexes the rank determination value and the MCS determination value into a control channel; performs error correction, coding and modulation on a signal resulting from the multiplexing; and supplies a signal resulting from the modulation to the IFFT unit 42. The IFFT unit 42 performs, for each of OFDM symbols, IFFT processing on the modulated, control channel to transform the modulated control channel into a time-domain signal, and supplies the time-domain signal to the CP addition unit 43. The CP addition unit 43 adds, for each of the OFDM symbols, a CP to the time-domain baseband signal. The transmission unit 44 performs up-conversion of a signal resulting from the addition of the CPs and thereby converts the baseband signal, into a radio frequency (RF) signal. The RF signal is transmitted from the antenna 31-1 via the duplexer 32.

The DM-RS channel estimation unit 39 calculates a second channel estimation value indicating a propagation-path state in accordance with a rank determination value, on the basis of the DM-RSs each having been extracted from a corresponding one of the demapping units 36-1 and 36-2, and supplies the second channel estimation value to the data channel demodulation/decoding unit 40. Here, this rank determination value is a rank determination, value which indicates a transmission rank number corresponding to the received DM-RS and data channel, and which, in a previous transmission process, was calculated by the rank determination/MCS determination unit 38 and was notified to a relevant one the mobile stations 12-1 to 12-N after the multiplexing into a control channel. The data channel demodulation/decoding unit 40 performs demodulation/decoding of the data channel having been extracted, by each of the demapping units 36-1 and 36-2 by using the second channel estimation value. Here, as a method for the demodulation, for example, a minimum mean square error (MMSE) method is used, and as a method for the decoding, a turbo decoding method is used.

Next, operation of the DM-RS channel estimation unit 39 will be described. The complex conjugate unit 62 calculates a complex conjugate value of a known DM-RS sequence which is internally generated, and supplies the complex conjugate value to the multiplier unit 61. The multiplier unit 61 multiplies the DM-RS, which is supplied from each of the demapping units, by the complex, conjugate value, which is supplied from the complex conjugate unit 62, to remove modulated elements of the DM-RS, and supplies a resultant signal to the equalizing unit 63.

Figure 4:
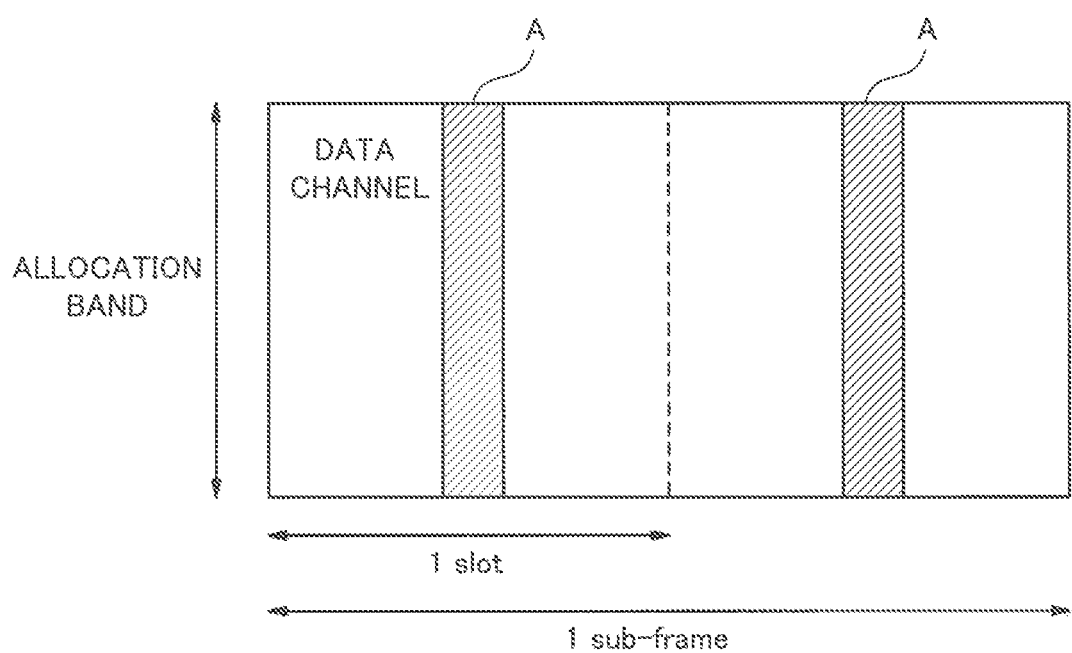
FIG. 4 A diagram illustrating an example of multiplexing of a DM-RS and a data channel FIG. 5 A block diagram illustrating an example of a configuration of a mobile station 12

Here, an example of multiplexing of a DM-RS and a data channel is illustrated in FIG. 4. In FIG. 4, a square enclosed by a thick line indicates a data channel, and a shaded area A indicates a DM-RS (demodulation reference signal). In FIG. 4, a first slot and a second slot, which are partitioned by a dotted line, are illustrated. The DM-RS is allocated to each of the first and second slots in unit of one symbol. The equalizing unit 63 performs equalizing between the first slot and the second slot with respect to the signal resulting from the removal of the modulated elements of the DM-RS, and supplies a signal, resulting from the equalizing to the frequency axis interpolation unit 64. In addition, without performing the equalizing, the signal resulting from the removal of the modulated elements of the DM-RS for each of the first and second slots may be supplied to the frequency axis interpolation unit 64 as it is.

The frequency axis interpolation unit 64 performs interpolation processing in the frequency direction on the signal resulting from the equalizing by a difference number by which the number of actual sub-carriers is smaller as compared with the number of sampling points of an IFFT performed at a posterior stage (sub-carries of the difference number being associated with unused sub-carriers), and supplies a signal resulting from the interpolation processing to the IFFT unit 65. Here, the interpolation processing is changed in accordance with a rank determination value.

Hereinafter, a specific example of the interpolation processing will be described. First, the output of the equalizing unit and the output of the frequency axis interpolation unit are defined as shown in Formula 1.

[Mathematical 1]

$$H_1(k) \text{ for } 0 \leq k \leq N_1 \ldots \text{Output of Equalizing Unit}$$

$$H_{VCFR}(k) \text{ for } 0 \leq k \leq N \ldots \text{Output of Frequency Axis Interpolation Unit} \quad \text{(Formula 1)}$$

First interpolation processing is represented by Formula 2, Formula 3, and Formula 4. That is, in the first interpolation processing, the interpolation is performed by applying an arithmetic operation represented by Formula 2, an arithmetic operation represented by Formula 3, and an arithmetic operation represented by Formula 4 in this order.

[Mathematical 2]

$$H_{EL}(k) = H_1(0) + \left(\frac{H_1(0) - H_1(N_P - 1)}{N_P - 1}\right)(k + 1) \quad \text{(Formula 2)}$$

$$H_{ER}(k) = H_1(N_1 - 1) + \left(\frac{H_1(N_1 - 1) - H_1(N_1 - N_P)}{N_P - 1}\right)(k + 1)$$

Here, Np is a parameter.
[Mathematical 3]

$$H_{VWF}(k) = \begin{cases} H_{ER}(k) & \text{for } 0 \leq k < 2 \\ H_{ER}(1) + \left(\frac{H_{EL}(1) - H_{ER}(1)}{N - N_1 - 3}\right)(k - 1) & \text{for } 2 \leq k < 2 + L \\ 0 & \text{for } 2 + L \leq k < N - N_1 - (L + 2) \\ H_{ER}(1) + \left(\frac{H_{EL}(1) - H_{ER}(1)}{N - N_1 - 3}\right)(k - 1) & \text{for } N - N_1 - (L + 2) \leq k < N - N_1 - 2 \\ H_{EL}(-k + N - N_1 - 1) & \text{for } N - N_1 - 2 \leq k < N - N_1 \end{cases} \quad \text{(Formula 3)}$$

Here, L is a parameter.
[Mathematical 4]

$$H_{VCFR}(k) = \begin{cases} H_1(l) & \text{for } 0 \leq k < N_1 \\ H_{VWF}(k - N_1) & \text{for } N_1 \leq k < N \end{cases} \quad \text{(Formula 4)}$$

Second interpolation processing is represented by Formula 5, Formula 6, Formula 3, and Formula 4. That is, in the second interpolation processing, the interpolation is performed by applying an arithmetic operation represented by Formula 5, an arithmetic operation represented by Formula 6, and an arithmetic operation represented by Formula 3, and an arithmetic operation represented by Formula 4 in this order.
[FORMULA 5]

$$H'_1(N_a k) = \frac{1}{N_a} \sum_{i=0}^{N_a-1} H_1(N_a k + i) \text{ for } 0 \leq k < N_b \quad \text{(Formula 5)}$$

$$H'_1(N_a k + j) = H'_1(N_a k) + \left( \frac{H'_1(N_a(k+1)) - H'_1(N_a k)}{N_a} \right) j$$

for $0 \leq k < N_b - 1$, $1 \leq j < N_a$ $$H'_1(N_a(N_b - 1) + j) = H'_1(N_a(N_b - 1)) + \left( \frac{H'_1(N_a(N_b - 1)) - H'_1(N_a(N_b - 2))}{N_a} \right) j$$

for $1 \leq j < N_1 - N_a(N_b - 1)$

Here, Na is a parameter. Nb is the largest integer that does not exceed N1/Na.
[Mathematical 6]

$$H_{EL}(k) = H'_1(0) + \left( \frac{H'_1(0) - H'_1(N_P - 1)}{N_P - 1} \right)(k + 1) \quad \text{(Formula 6)}$$

$$H_{ER}(k) = H'_1(N_1 - 1) + \left( \frac{H'_1(N_1 - 1) - H'_1(N_1 - N_P)}{N_P - 1} \right)(k + 1)$$

Third interpolation processing is represented by Formula 7. That is, in the third interpolation processing, the interpolation is performed by applying an arithmetic operation represented by Formula 7.
[Mathematical 7]

$$H_{VCFR}(k) = \begin{cases} H_1(k) & \text{for } 0 \leq k < N_1 \\ 0 & \text{for } N_1 \leq k < N \end{cases} \quad \text{(Formula 7)}$$

As an example of the change of the interpolation processing, the first interpolation processing is performed, in the case where the rank determination value is "1", and the second interpolation processing is performed in the case where the rank determination value is a value other than "1". Further, the parameter Na in Formula 5 for the second interpolation processing may be changed in accordance with, the rank determination value. For example, in the case where the rank determination value is "2", the parameter Na is made "2", and in the case where the rank determination value is larger than or equal to "3", the parameter Na is made "4". As another example of the change of the interpolation processing, the first interpolation processing may be performed in the case where the rank determination value is "1"; otherwise the third interpolation processing may be performed.

In addition, in the case where a plurality of mobile stations 12 exists and each of the plurality of mobile stations 12 transmits DM-RSs and a data channel at the same frequency during the same period of time by performing space-multiplexing of the DM-RSs and the data channel, the interpolation processing is performed just like the case where the rank determination value is a value other than "1".

Here, the DM-RS which is generated in a DM-RS generation unit 107 (described below) in each of the mobile stations 12-1 to 12-N is supposed to be generated on the basis of a Zadoff-Chu sequence as described in section 5.5.2 of NPL 2.

With respect to the DM-RS generated in this way, supposedly, when the rank determination value is a value other than "1", the same first interpolation processing as that in the case where the rank determination value is "1" is performed, the accuracy of each of channel estimation values in high-frequency sub-carries, which are obtained after the processes by the IFFT unit 65, the noise elimination unit 66, the FFT unit 67, and the cut-off unit 68, which are performed at posterior stages, degrades to a greater degree. Thus, in the case where the rank determination value is a value other than "1", the second interpolation processing or the third interpolation processing is performed. In the second interpolation processing, it is possible to suppress the influence of an interference layer by performing equalizing processing among a plurality of sub-careers before the interpolation. Further, the third interpolation processing is not influenced by the interference layer because each of unused sub-carrier portions is simply filled with "0".

In addition, hereinbefore, the interpolation processing has been described, but the aforementioned interpolation processing is just an example, and an interpolation processing method which is changed in accordance with a rank determination value is not limited to the aforementioned interpolation processing method.

The IFFT unit 65 performs IFFT processing on a signal resulting from the interpolation processing to generate a channel profile on the time axis, and supplies the channel profile to the noise elimination unit 66. The noise elimination unit 66 is configured to, for the channel profile on the time axis, when a value within a window having a predetermined width is larger than or equal to a predetermined noise level, leave the value as it is, and when the value within the window is smaller than the predetermined noise level, replace the value by "0". Further, the noise elimination unit 66 replaces each of all values outside the window by "0". A signal resulting from the elimination of interference elements and noise elements in such a way as described above is supplied to the FFT unit 67. The FFT unit 67 performs FFT processing on the signal resulting from the elimination of interference elements and noise elements to transform the signal into a frequency-domain signal, and supplies the frequency-domain signal to the cut-off unit 68. The cut-off unit 68 removes signals, each having been interpolated through the interpolation processing on a corresponding one of unused sub-carrier portions, from signals included in the frequency-domain signal, and supplies a resultant frequency-domain signal to the time axis interpolation unit 69. The time axis interpolation unit 69 performs interpolation, processing in the time direction on the frequency-domain signal resulting from the removal of the signals having been interpolated on the unused sub-carrier portions; calculates a channel estimation value for one sub-frame including portions on each of which any DM-RS is not multiplexed; and supplies the channel estimation value to the data channel demodulation/decoding unit 40. Here, for example, in the case where the equalizing has been performed in the equalizing unit 63, merely, the output of the cut-off unit 68 is repeated in each of all SC-FDMA symbols within one sub-frame. Meanwhile, in the case where the equalizing has not been performed in the equalizing unit 63, a first linear interpolation is performed in the time direction on the output of the cut-off unit 68.

As described above, the base station 11 is configured to, in order to perform channel estimation based on the DM-RS, in accordance with the rank determination, value having been notified to a relevant one of the mobile stations 12-1 to 12-N, perform channel estimation corresponding to a transmission rank number transmitted from the relevant one of the mobile stations 12-1 to 12-N. In the case where the rank determination value is "1", frequency direction interpolation processing based on extrapolation and interpolation is performed. This is performed in order to suppress unnecessary leakage in the channel profile on the time axis. Meanwhile, in the case where the rank determination value is a value other than "1", after equalizing processing is performed among a plurality of sub-carriers, frequency direction interpolation processing based on extrapolation and interpolation is performed or interpolation processing for fixing to zero is performed. This is performed in order to suppress the degradation of channel, estimation accuracy, caused by the Zadoff-Chu sequence.

Figure 5:
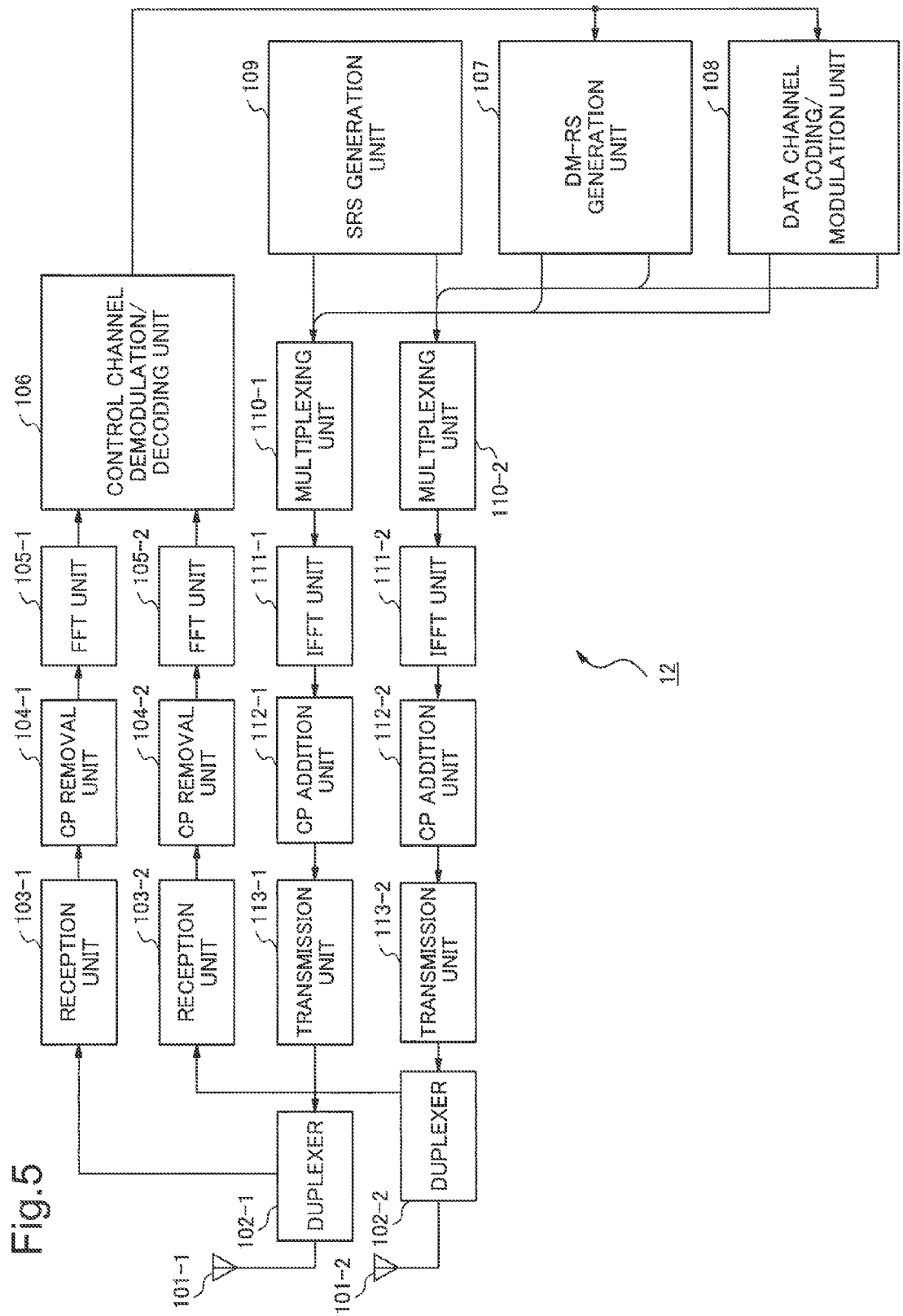

Next, a detailed, configuration of the mobile station 12 will be described with reference to FIG. 5. The mobile station 12 includes antennas 101-1 and 101-2; duplexers 102-1 and 102-2; reception units 103-1 and 103-2; CP removal units 104-1 and 104-2; FFT units 105-1 and 105-2; a control channel demodulation/decoding unit 106; a DM-RS generation unit 107; a data channel coding/modulation unit 108; an SRS generation unit 109; multiplexers 110-1 and 110-2; IFFT units 111-1 and 111-2; CP addition units 112-1 and 112-2; and transmission units 113-1 and 113-2.

Each of the reception units 103-1 and 103-2 converts a received signal received by a corresponding one of the antennas 101-1 and 101-2 into a baseband signal and supplies the baseband signal to a corresponding one of the CP removal units 104-1 and 104-2. Each of the CP removal units 1-04-1 and 104-2 remove CPs from each of OFDM symbols included in the baseband signal and supplies a signal resulting from the removal of the CPs to a corresponding one of the FFT units 105-1 and 105-2. Each of the FFT units 105-1 and 105-2 performs FFT processing, for each of the OFDM symbols, on the baseband signal resulting from the removal of the CPs to transform the baseband signal into a frequency domain signal, and supplies the frequency domain signal to the control channel demodulation/decoding unit 106. The control channel demodulation/decoding unit 106 performs demodulation/decoding of a control channel from the frequency domain signal resulting from the FFT processing, and calculates a rank determination value and an MCS determination value having been notified from the base station 11. The rank determination value is supplied to the DM-RS generation unit 107 and the data channel coding/modulation unit 108. The MCS determination value is supplied to the data channel coding/modulation unit 108.

The SRS generation unit 109 generates an SRS by performing predetermined processing. The DM-RS generation unit 107 generates a DM-RS in accordance with the rank determination value by performing predetermined processing. The data channel coding/modulation unit 108 performs, in accordance with the rank determination value and the MCS determination value, coding/modulation of a data channel, by performing predetermined processing, and supplies the data channel to each of the multiplexers 110-1 and 110-2. Each of the multiplexer 110-1 and 110-2 multiplexes the SRS and the DM-RS as well as the data channel resulting from the coding/modulation, by performing predetermined processing, and supplies a signal resulting from the multiplexing to a corresponding one of the IFFT units 111-1 and 111-2. Each of the IFFT units 111-1 and 111-2 performs IFFT processing, for each of SC-FDMA symbol, on the signal resulting from the multiplexing to transform the signal to a time-domain baseband signal, and supplies the time-domain baseband signal, to each of the CP addition units 112-1 and 112-2. Each of the CP addition units 112-1 and 112-2 adds a CP, for each of the SC-FDMA symbols, to the time-domain baseband signal, and supplies a baseband signal resulting from the addition of the CPs to each of the transmission units 113-1 and 113-2. Each of the transmission units 113-1 and 113-2 performs up-conversion of the baseband signal resulting from, the addition of the CPs to convert the baseband signal to an RF signal, and supplies the RF signal to a corresponding one of the antennas 101-1 and 101-2 via a corresponding one of the duplexers 102-1 and 102-2. The RF signal is transmitted from each of the antennas 101-1 and 101-2.

Figure 6:
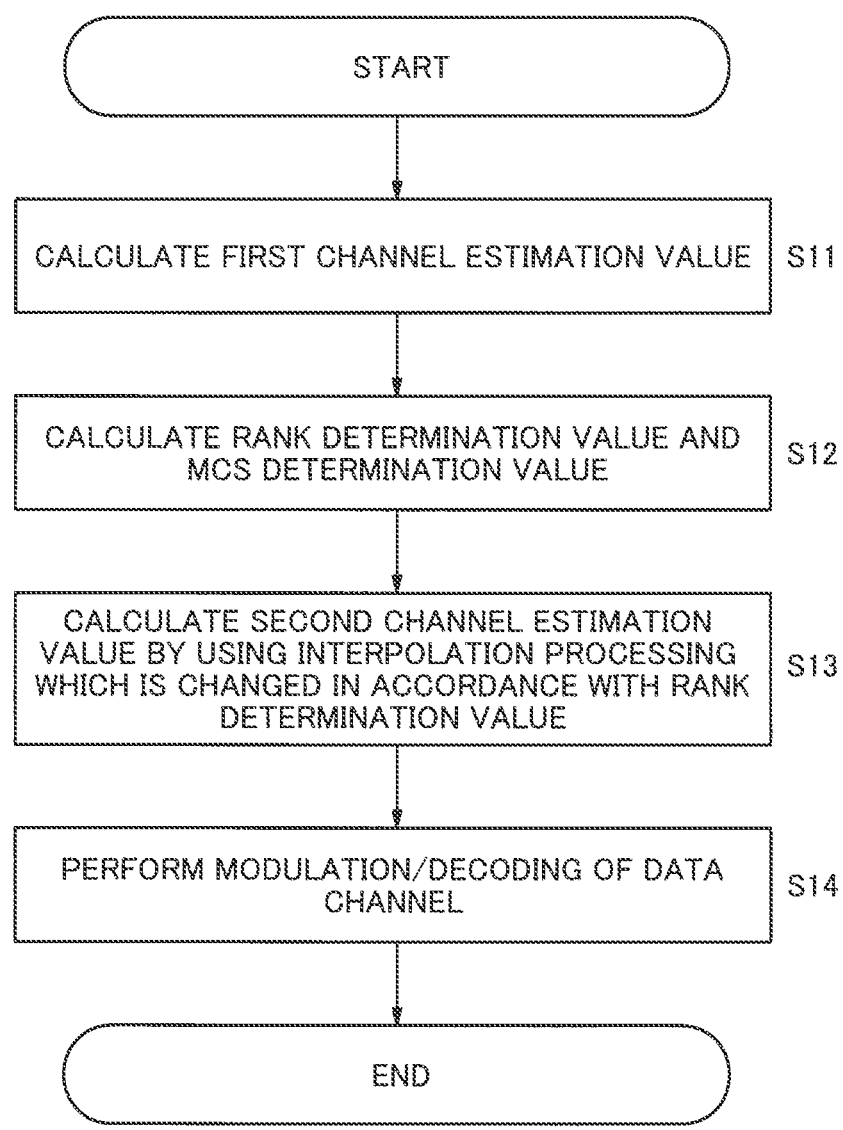
FIG. 6 A flowchart that describes processing for demodulation/decoding

Next, processing for demodulation/decoding will be described with reference to a flowchart shown in FIG. 6. In step S11, the SRS channel estimation unit 3 calculates first channel estimation values on the basis of sounding reference signals (SRSs) having been transmitted from the mobile station 12. In step S12, the rank determination/MCS determination unit 38 calculates a rank determination value and an MCS determination value corresponding to a transmission rank number and a transmission coding/modulation scheme, respectively, which are used when the mobile station 12 transmits a data channel next, on the basis of the calculated first channel estimation values.

In step S13, through the use of interpolation processing which, is changed in accordance with a rank determination value, the frequency axis interpolation unit 64 performs interpolation processing in the frequency direction by a number corresponding to the number of unused sub-carriers; and the DM-RS channel estimation unit 39 calculates a second channel estimation value for use in demodulation processing for a data channel, from the result of the interpolation processing. That is, through the use of interpolation processing which is changed in accordance with a rank determination value, the DM-RS channel estimation unit 39 calculates a second channel estimation value for use in demodulation processing for a data channel on the basis of the demodulation reference signals (DM-RSs) having been transmitted from the mobile station 12. In step S14, data channel demodulation/decoding unit 40 performs demodulation/decoding of a data channel by using the second channel estimation value, and then terminates the processing for demodulation/decoding.

The method for changing the interpolation processing in the DM-RS channel estimation unit 39 can be further devised. In this case, the rank determination/MCS determination unit 38 calculates a rank determination value and an MCS determination value corresponding to a transmission rank number and a transmission coding/modulation scheme, respectively, which are used when the mobile station 12 transmits a data channel next, and supplies both the rank determination value and the MCS determination value to the DM-RS channel estimation unit 39.

Figure 7:
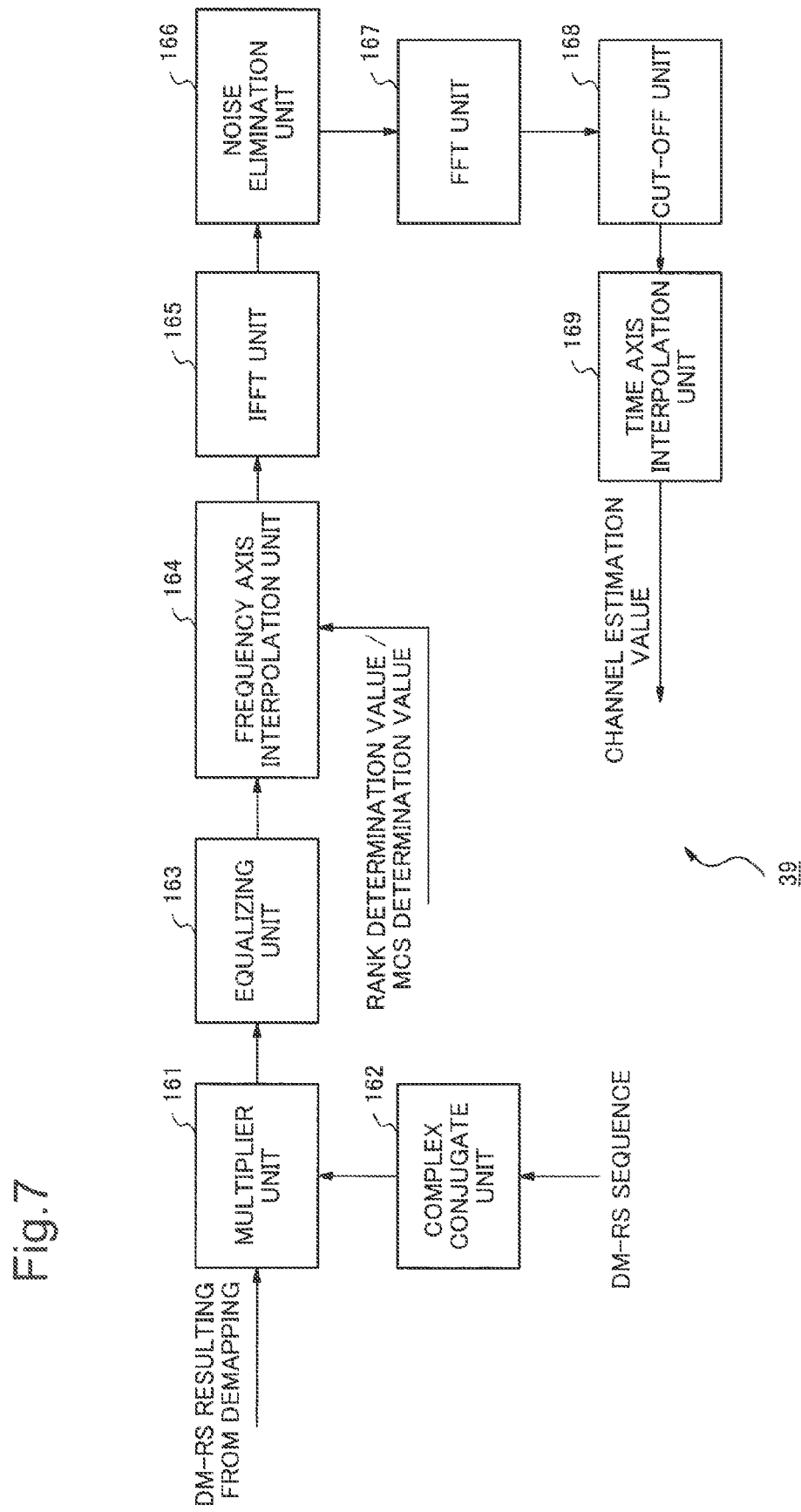
FIG. 7 A block diagram illustrating another example of a detailed configuration of the DM-RS channel estimation unit 39

FIG. 7 is a block diagram illustrating the details of an example of a different configuration of the DM-RS channel estimation unit 39. In the DM-RS channel estimation unit 39 whose configuration is illustrated in FIG. 7, frequency direction interpolation processing is changed on the basis of the MCS determination value, in addition to the rank determination value.

The DM-RS channel estimation unit 39 shown in FIG. 7 includes a multiplier unit 161; a complex conjugate unit 162; an equalizing unit 163; a frequency axis interpolation unit 164; an IFFT unit 165; a noise elimination unit 166; an FFT unit 167; a cut-off unit 168; and a time axis Interpolation unit 169. The multiplier unit 161, the complex conjugate unit 162, and the equalizing unit 163 are similar to the multiplier unit 61, the complex conjugate unit 62, and the equalizing unit 63, respectively, and thus, the description thereof is omitted here.

The frequency axis interpolation unit 164 performs, just like the frequency axis interpolation unit 64, interpolation in the frequency direction on a signal resulting from equalization by a number corresponding to the number of unused sub-carriers and supplies a signal resulting from the interpolation processing to the IFFT unit 165. Here, the interpolation processing by the frequency axis interpolation unit 164 is changed in accordance with the MCS determination value, in addition to the rank determination value. As an example of the change of the interpolation processing, the first interpolation processing represented by Formula 2, Formula 3, and Formula 4 may be performed in the case where the rank determination value is equal to "1" and the MCS determination value is larger than or equal to a predetermined threshold value, and further the parameter Np of Formula 2 and parameter L of Formula 3 may be changed in accordance with the MCS determination value. Otherwise, that is, in the case where the rank determination value is a value other than "1", or the MCS determination value is smaller than the predetermined threshold value, the second interpolation processing represented by Formula 5, Formula 6, Formula 3, and Formula 4 is performed.

The case where the MCS determination value is smaller than the predetermined threshold value means a case where, since a propagation-path state is inferior, a modulation scheme having a small modulation multi-value (for example, QPSK) is selected and a small coding rate is selected in order to cause the error correction efficiency to increase. In such a case where the propagation-path state is inferior, the first interpolation processing represented by Formula 2, Formula 3, and Formula 4 is ineffective or brings about low interpolation accuracy, and, as a result, degrades the channel estimation accuracy. Thus, in the case where the MCS determination value is smaller than the predetermined threshold value, the second interpolation processing represented by Formula 5, Formula 6, Formula 3, and Formula 4 is performed and thereby the equalization among the sub-carriers causes the influence of noise as well as the influence of the interference layer to be suppressed.

Further, as another example of the change of the interpolation processing, the first interpolation processing represented by Formula 2, Formula 3, and Formula 4 may be performed in the case where the rank determination value is equal to "1" and the MCS determination value is larger than or equal, to a predetermined threshold value, and further the parameter Np of Formula 2 and parameter L of Formula 3 may be changed in accordance with the MCS determination value. Otherwise, that is, in the case where the rank determination value is a value other than "1", or the MCS determination value is smaller than the predetermined threshold value, the third interpolation processing represented by Formula 7 is performed. This is performed in order to fill each of the unused sub-carrier portions with "0" for the purpose of suppressing the degradation of the interpolation accuracy in the case where the MCS determination value is smaller than the predetermined threshold value and the propagation-path state is inferior.

As described above, in this exemplary embodiment, the frequency direction interpolation processing is changed in view of the MCS determination value, and thus, this method is efficient because it becomes possible to determine an interpolation processing in accordance with a propagation-path state without needing exclusive SNR estimation.

Figure 3:
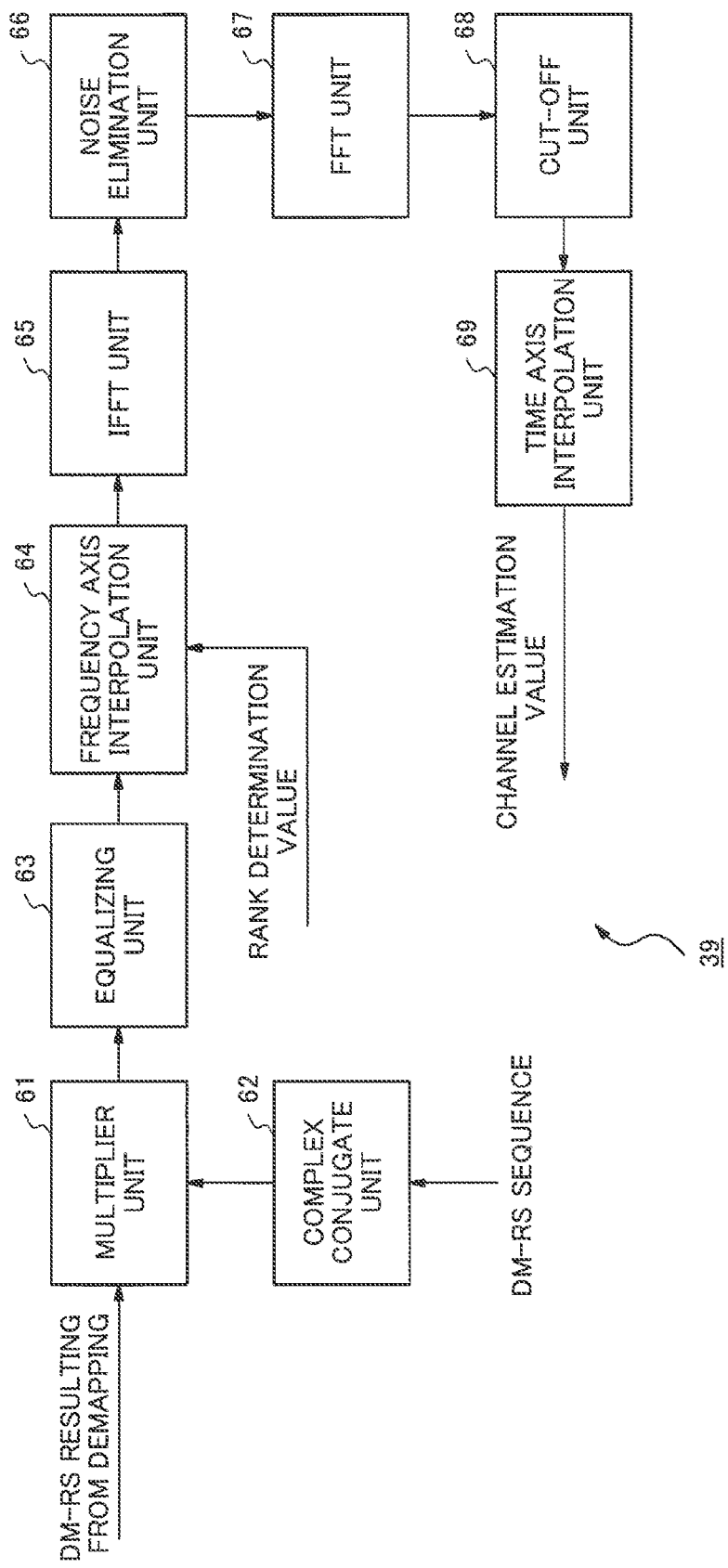
FIG. 3 A block diagram illustrating a example of a detailed configuration of a DM-RS channel estimation unit 39

Since the IFFT unit 165, the noise elimination unit 166, the FFT unit 167, the cut-off unit 168, and the time axis interpolation unit 169 are similar to the IFFT unit 65, the noise elimination unit 66, the FFT unit 67, the cut-off unit 68, and the time axis interpolation unit 69 in FIG. 3, respectively, the description thereof is omitted here.

As described above, this communication system is characterized in that, in a receiver for receiving a single carrier-frequency division multiple access (SC-FDMA) signal, frequency-direction interpolation processing for unused sub-carriers is changed in accordance with a transmission rank-number and a modulation and coding scheme (MCS) and thereby optimum channel, estimation in accordance with conditions can be achieved.

The SRS channel estimation unit 37 included in the base station 11 calculates first channel estimation values on the basis of sounding reference signals (SRSs) having been transmitted from the mobile station 12. The rank determination/MCS determination unit 38 calculates a rank determination, value and an MCS determination value corresponding to a transmission rank number and a transmission coding ratio/modulation scheme, respectively, which are used when the mobile station 12 transmits a data channel next, on the basis of the calculated first channel estimation values. The calculated rank determination value and MCS determination value are notified to the mobile station 12 via a control channel, and simultaneously therewith they are inputted to the DM-RS channel estimation unit 39.

The DM-RS channel estimation unit 39 calculates a second channel estimation value for use in demodulation processing on a data channel on the basis of a demodulation reference signals (DM-RSs) having been transmitted from the mobile station 12. The frequency axis interpolation unit 64 included in the DM-RS channel estimation unit 39 changes interpolation processing in accordance with the rank determination value and the MCS determination value having been, determined above.

The DM-RS channel estimation unit 39 calculates the second channel estimation value by using interpolation processing for interpolating sub-carriers in the frequency direction. Further, the DM-RS channel, estimation unit 39 calculates the second channel estimation value by performing interpolation processing after having performed equalization processing among a plurality of sub-carriers, or using interpolation processing for filling each of unused sub-carriers with "0".

In this way, in this communication, system, since the interpolation processing is changed on the basis of the rank determination value and the MCS determination value, optimum channel estimation in accordance with transmission conditions of a data channel transmitted from the mobile station 12 can be performed.

Accordingly, since frequency direction interpolation processing for unused sub-carriers is determined on the basis of the rank determination value and the MCS determination value, it is possible to perform optimum channel estimation in accordance with transmission conditions of a data channel.

Further, the method of making the MCS determination value a baseline makes it possible to determine interpolation processing in accordance with a transmission path state without, needing exclusive SNR estimation, and thus, makes the processing efficient.

More specifically, firstly, since channel estimation based on a DM-RS is performed in accordance with a rank determination value, it is possible to perform optimum channel estimation in accordance with the DM-RS and the transmission rank number of a data channel.

Moreover, secondary, since channel estimation based on a DM-RS is performed by using a rank determination value to be notified, to the mobile station 12, processing other than calculating the rank determination value to be notified to the mobile station 12 becomes unnecessary, and thus it becomes possible to suppress the increase of a circuit size and processing delay.

In addition, although, in the aforementioned description, the number of transmission antennas of the mobile station 12 (i.e., the antennas 101-1 and 101-2) is two, and the number of reception antennas of the base station 11 (i.e., the antennas 31-1 and 31-2) is two, in the case where at least one of the number of transmission antennas of the mobile station 12 and the number of reception antennas of the base station 11 exceeds two, the aforementioned method of this embodiment can be similarly applied.

Further, in the case where a frequency resource allocated to the mobile station 12 is discrete (that is, the frequency resource is divided into a plurality of clusters), the aforementioned method of this embodiment can be similarly applied.

The series of processes described above can be executed by hardware, and can be also executed by software. In the case where the series of processes is executed by software, programs constituting the software are installed from, a program recording medium into a computer embedded in dedicated hardware or a computer, such as a general-purpose personal computer, which becomes capable of performing various functions through various programs installed therein.

Figure 8:
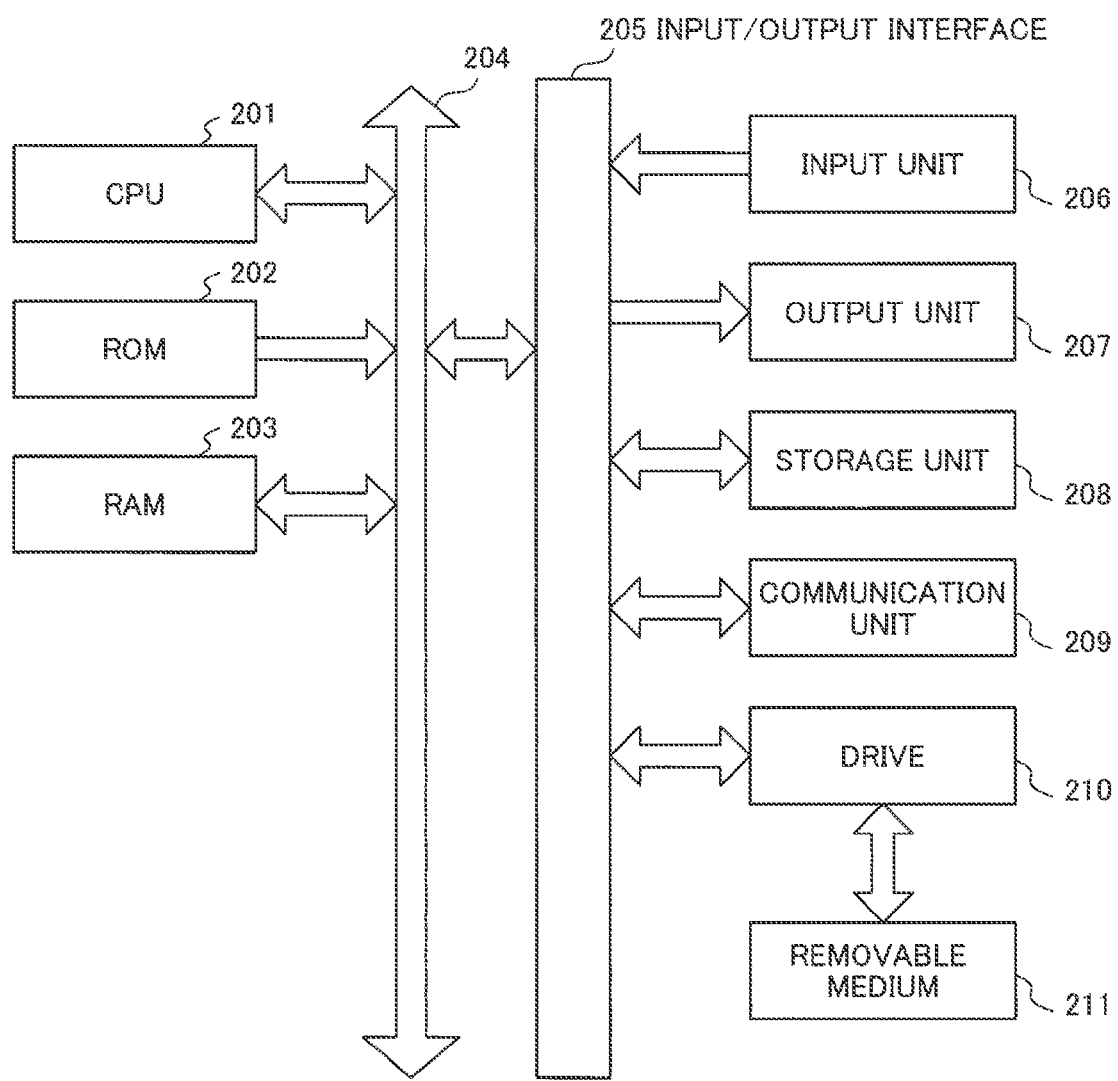
FIG. 8 A block diagram illustrating an example of a configuration of hardware of a computer FIG. 9 A block diagram illustrating a configuration of a related base station FIG. 10 A block diagram illustrating a configuration of a DM-RS channel estimation unit 339

FIG. 8 is a block diagram illustrating an example of a configuration of hardware of a computer which causes programs installed therein to execute the series of processes described above.

In the computer, a central processing unit (CPU) 201, read only memory (ROM) 202, and random access memory (RAM) 203 are electrically connected to one another via a bus 204.

The bus 204 is further connected to an input/output interface 205, electrically. The input/output, interface 205 is electrically connected to an input unit 206 including a keyboard, a mouse device, a microphone, and the like; an output unit 207 including a display, a speaker, and the like; a storage unit 208 including a hard disc, a non-volatile memory device, and the like; a communication unit 209 including a wireless communication unit, a network interface, or the like; and a drive 210 for driving a removable medium 211, such as a magnetic disc, an optical disc, a magneto-optical disc, or a semiconductor memory device.

In a computer configured in such a way described above, the series of processes described above are performed by causing the CPU 201 to load the programs stored in the storage unit 208 into the RAM 203 via the input/output interface 205 and the bus 204, and execute the loaded programs.

The programs executed by the computer (the CPU 201) are provided in the form of being recorded in the removable medium 211 as a package medium including a magnetic disc (including a flexible disc), an optical disc (such as a compact disc-read only memory (CD-ROM) or a digital versatile disc (DVD)), a magneto-optical disc or a semiconductor memory device. Alternatively, the programs are provided via at least one of wired or wireless transmission media including, for example, a local area network, the Internet, a digital satellite broadcasting network, and the like.

Further, it is possible to install the programs into the computer by allowing the removal medium 211 to be mounted in the drive 210 and allow the programs recorded in the removal medium 211 to be stored into the storage unit 208 via the input/output interface 205. Further, it is possible to install the programs into the computer by allowing the communication unit. 209 to receive the programs having been transmitted via at least one of wired or wireless transmission media and allow the received programs to be stored into the storage unit 208.

Besides, it is possible to install, the programs in the computer in advance by allowing the ROM 202 or the storage unit 208 to store the programs therein in advance.

Further, the programs executed by the computer may be programs each of which is processed in time series in accordance with order of the description of this patent description: programs which are processed in parallel, or programs any one of which is processed at necessary timing, such as timing at which a calling request has been made.

The communication system according to the exemplary embodiment of the present invention can be applied to a wireless communication system and, more particularly, a mobile communication system including a propagation path whose state temporally varies.

Further, the exemplary embodiment of the present invention is not limited to the aforementioned exemplary embodiment, and various modifications can be made on the present invention within a scope not departing from the gist of the present invention.

REFERENCE SIGNS LIST

11: Base station (Receiving device), 12 and 12-1 to 12-N: Mobile station, 31-1 and 31-2: Antenna, 32: Duplexer, 33-1 and 33-2: Reception unit, 34-1 and 34-2: CP removal unit, 35-1 and 35-2: FFT unit, 36-1 and 36-2: Demapping unit, 37: SRS channel estimation unit (first calculating means), 38: Rank determination/MCS determination unit (second calculating means), 39: DM-RS channel estimation unit (third calculating means), 40: Data channel demodulation/decoding unit (demodulation/decoding means), 41: Control channel coding/modulation unit, 42: IFFT unit, 43: CP addition unit, 44: Transmission unit, 61: Multiplier unit, 62: Complex conjugate unit, 63: Equalizing unit, 64: Frequency axis interpolation unit, 65: IFFT unit, 66: Noise elimination unit, 67: FFT unit, 68: Cut-off unit, 69: Time axis interpolation unit, 161: Multiplier unit, 162: Complex conjugate unit, 163: Equalizing unit, 164: Frequency axis interpolation unit, 165: IFFT unit, 166: Noise elimination unit, 167: FFT unit, 168: Cut-off unit, 169: Time axis interpolation unit, 201: CPU, 202; ROM, 203: RAM, 208: Storage unit, 209: Communication unit, 211: Removable medium

The invention claimed is:

1. A receiving device that receives a single carrier-frequency division multiple access (SC-FDMA) signal, the receiving device comprising:
   first calculating unit that calculates a first channel estimation value indicating a state of a propagation path, on the basis of a sounding reference signal transmitted from a transmitting end device;
   second calculating unit that calculates, on the basis of the first channel estimation value, a rank determination value associated with a transmission rank number and a modulation and coding scheme (MCS) determination value, which are used when the transmitting end device transmits a data channel next;
   third calculating unit that calculates a second channel estimation value indicating a state of a propagation path, on the basis of a demodulation reference signal, by using interpolation processing in accordance with at least one of the rank determination value and the MCS determination value; and
   an unit that performs demodulation and decoding of a data channel by using the second channel estimation value.

2. The receiving device according to claim 1, wherein the third calculating unit calculates the second channel estimation value by using the interpolation processing which interpolates a sub-carrier in a frequency direction.

3. The receiving device according to claim 2, wherein the third calculating unit calculates the second channel estimation value by using the interpolation processing which performs interpolation after execution of equalizing processing among a plurality of the sub-carries or by using the interpolation processing which performs filling of each of at least one unused sub-carrier portion with zero.

4. The receiving device according to claim 1, wherein the third calculating unit calculates the second channel estimation value by using the interpolation processing which performs interpolation after execution of equalizing processing among a plurality of the sub-carries or by using the interpolation processing which performs filling of each of at least one unused sub-carrier portion with zero.

5. A receiving method for receiving a SC-FDMA signal, the receiving method comprising:

calculating a first channel estimation value indicating a state of a propagation path, on the basis of a sounding reference signal transmitted from a transmitting end device;

calculating, on the basis of the first channel estimation value, a rank determination value associated with a transmission rank number and a modulation and coding scheme (MCS) determination value, which are used when the transmitting end device transmits a data channel next;

calculating a second channel estimation value indicating a state of a propagation path, on the basis of a demodulation reference signal, by using interpolation processing in accordance with at least one of the rank determination value and the MCS determination value; and performing demodulation and decoding of a data channel by using the second channel estimation value.

6. A non-transitory computer readable medium embodying instructions for a controlling a device to implement a method for controlling a receiving device that receives a SC-FDMA signal the method comprising:

calculating a first channel estimation value indicating a state of a propagation path, on the basis of a sounding reference signal transmitted from a transmitting end device;

calculating, on the basis of the first channel estimation value, a rank determination value associated with a transmission rank number and a modulation and coding scheme (MCS) determination value, which are used when the transmitting end device transmits a data channel next;

calculating a second channel estimation value indicating a state of a propagation path, on the basis of a demodulation reference signal, by using interpolation processing in accordance with at least one of the rank determination value and the MCS determination value; and performing demodulation and decoding of a data channel by using the second channel estimation value.

\* \* \* \* \*